United States Patent [19]
Cho

[11] Patent Number: 6,065,732
[45] Date of Patent: May 23, 2000

[54] PIVOTAL ROTATION ADJUSTING APPARATUS FOR FLAT PANEL DISPLAY DEVICE

[75] Inventor: Kyu Yeol Cho, Kumi, Rep. of Korea

[73] Assignee: LG Electronics Inc., Rep. of Korea

[21] Appl. No.: 09/229,276

[22] Filed: Jan. 13, 1999

[30] Foreign Application Priority Data

Mar. 30, 1998 [KR] Rep. of Korea ...................... 98-11039

[51] Int. Cl.[7] .................................................. A47G 29/00
[52] U.S. Cl. ............................................ 248/371; 248/922
[58] Field of Search .................................. 248/371, 917, 248/919, 920, 921, 922, 923

[56] References Cited

U.S. PATENT DOCUMENTS

| 5,765,794 | 6/1998 | Chen ..................................... 248/923 X |
| 5,873,554 | 2/1999 | Nobuchi ............................... 248/923 X |
| 5,941,488 | 8/1999 | Rosen ................................... 248/921 X |

*Primary Examiner*—Ramon O. Ramirez
*Attorney, Agent, or Firm*—Ostrolenk, Faber, Gerb & Soffen, LLP

[57] ABSTRACT

A pivotal rotation adjusting apparatus for a flat panel display device includes a fixed frame having a hole formed in each opposing side surface thereof, a pair of vertical rotation shafts respectively pivotally carried at one end in corresponding ones of the holes in the fixed frame and each having a pin axially extended from an end thereof, a vertical rotation frame disposed on each opposing side of the fixed frame, and having a hole receiving therein a corresponding one of the pins axially extended from a respective one of the vertical rotation shafts, a horizontal rotation shaft fixedly engaged to a lower portion of the fixed frame and being pivotally rotatable in conjunction with the fixed frame, a base housing rotatably supporting the horizontal rotation shaft therein, and a housing cover correspondingly engaged to the base housing. The apparatus permits effective adjustment of a horizontal rotation angle as well as a vertical rotation angle of the display screen section.

12 Claims, 5 Drawing Sheets

PIVOTAL ROTATION ADJUSTING APPARATUS FOR FLAT PANEL DISPLAY DEVICE

BACKGROUND OF THE INVENTION

1. Field of the Invention

The present invention relates to a flat panel display device such as liquid crystal display (LCD) for a lap top computer and a plasma display panel (PDP) device, and more particularly, to an improved pivotal rotation adjusting apparatus for a flat panel display device which enables a display screen section to be horizontally adjustable as well as vertically adjustable, thereby minimizing an unbalanced weight condition and providing enhanced viewablity.

2. Description of the Background Art

With reference to FIGS. 1 and 2, a conventional apparatus for adjusting a pivotal rotation of a flat panel display device includes a fixed frame 110, a vertical rotation shaft 120, a pair of vertical rotation frames 130 and a fixed shaft 140.

A through hole 110b is formed passing through the fixed frame 110 from side to side along a front edge thereof, and a first recess 110c is formed in a central portion of the fixed frame 110.

As shown in FIG. 2, pins 120a axially extend from each end portion of the vertical rotation shaft 120, which shaft 120 is rotatably carried in the through hole 110b in the fixed frame 110. Here, pins 120a are formed smaller in diameter than the vertical rotation shaft 120.

A blind hole 130a is formed in an inner end portion of each of the vertical rotation frames 130, 130 facing toward the fixed frame 110 and the pins 120a are correspondingly pressed into the blind holes 130a. Here, a display screen section (not shown) such as an LCD monitor is fixed onto the vertical rotation frames 130, 130.

That is, the vertical rotation frames 130, 130 are rotatably fixed onto the left and right sides of the fixed frame 110 through the vertical rotation shaft 120.

Meanwhile, as shown in FIG. 1, a first protrusion 140a formed on the upper end of the fixed shaft 140 is fixed into the first recess 110c of the fixed frame 110, whereby the fixed shaft 140 is vertically fixed into the fixed frame 110.

The fixed shaft 140 fixed into the fixed frame 110 is fixedly inserted into a base pad (not shown) so as to mount a display device on an upper portion of the base pad (not shown).

The thusly constituted conventional pivotal rotation adjusting apparatus for a flat panel display device enables a user to vertically incline a display screen section. Specifically, as the vertical rotation shaft 120 rotates on its own, the vertical rotation frames 130, 130 fixedly sustaining the display screen section move upwardly and downwardly.

However, although the conventional rotation adjusting apparatus for a flat panel display device permits adjustment of the inclination angle in its upward and downward movement, it is impossible to adjust a horizontal rotation angle.

Further, due to the self-weight of the display screen section, when the screen section is inclined, the base pad sustaining the screen section may fluctuate so that the set may lose balance or even tumble.

Still further, the inclination of the screen section may not maintain a constant angle due to the self-weight of the screen section.

SUMMARY OF THE INVENTION

The present invention is directed to overcoming the disadvantages of the conventional pivotal rotation adjusting apparatus.

Therefore, it is an object of the present invention to provide a pivotal rotation adjusting apparatus for a flat panel display device which is capable of adjusting a horizontal rotation angle as well as a vertical inclination angle of a display screen section.

It is another object of the present invention to provide a pivotal rotation adjusting apparatus for a flat panel display device which enables a display screen section to stably move upwardly and downwardly while restraining the fluctuation of the set resulting from the self-weight of the display screen section by surrounding the outer periphery of a vertical rotation shaft fixed through the fixed frame into a vertical rotation frame using a friction bushing.

It is still another object of the present invention to provide a pivotal rotation adjusting apparatus for a flat panel display device which restrains the fluctuation of the set resulting from the self-weight of the screen section and which enables stable rotation of the screen section.

Also, it is still another object of the present invention to provide a pivotal rotation adjusting apparatus for a flat panel display device which enables a display screen section to stably rotate while adjusting a rotational angle of the screen section by guiding a protrusion extended from a rear surface of a fixed frame into an accurate guide opening formed in an upper surface of a base member.

To achieve the above-described objects, there is provided a pivotal rotation adjusting apparatus for a flat panel display device, which includes a fixed frame having a hole formed in each opposing side surface thereof, a pair of vertical rotation shafts respectively pivotally carried at one end in corresponding ones of the holes in the fixed frame and each having a pin axially extended from an end thereof, a vertical rotation frame disposed on each opposing side of the fixed frame, and having a hole receiving therein a corresponding one of the pins axially extended from a respective one of the vertical rotation shafts, a horizontal rotation shaft fixedly engaged to a lower portion of the fixed frame and being pivotally rotatable in conjunction with the fixed frame, a base housing rotatably supporting the horizontal rotation shaft therein, and a housing cover correspondingly engaged to the base housing.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The pivotal rotation adjusting apparatus for a flat panel display device according to the present invention will now be described.

Figure 1:
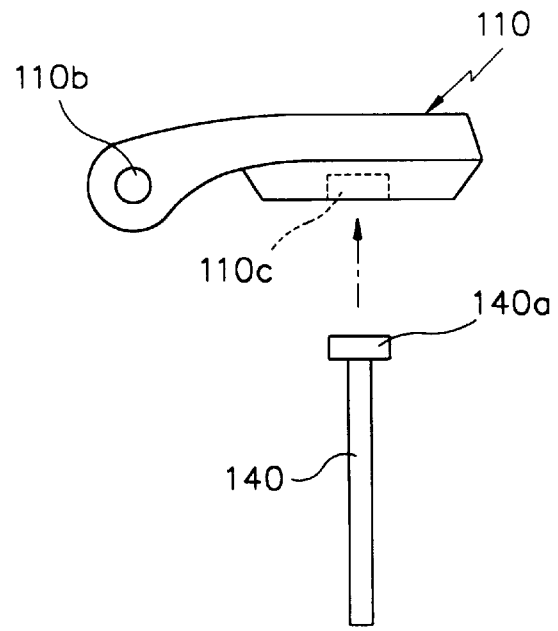
FIG. 1 is an exploded view illustrating the construction of a fixed frame and a horizontal rotation shaft in a conventional pivotal rotation adjusting apparatus for a flat display device.
Figure 2:
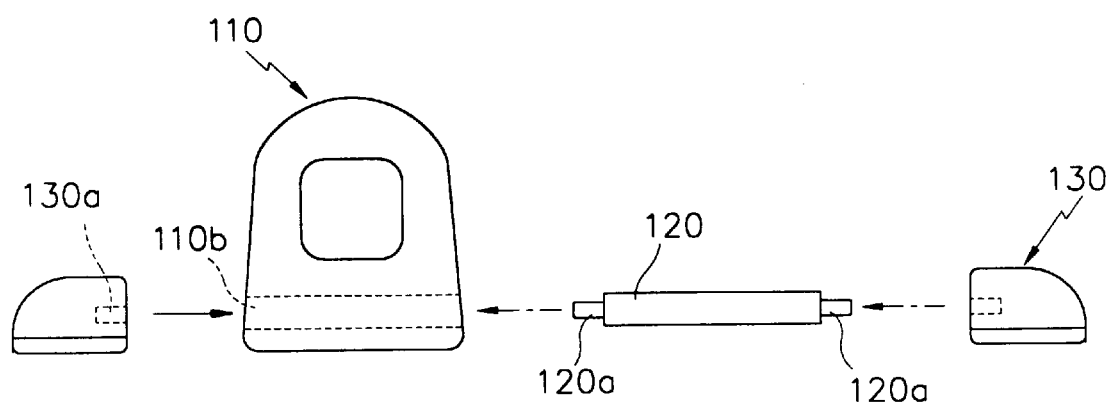
FIG. 2 is an exploded view illustrating a vertical rotation mechanism in the conventional pivotal rotation adjusting apparatus for a flat panel display device.
Figure 3:
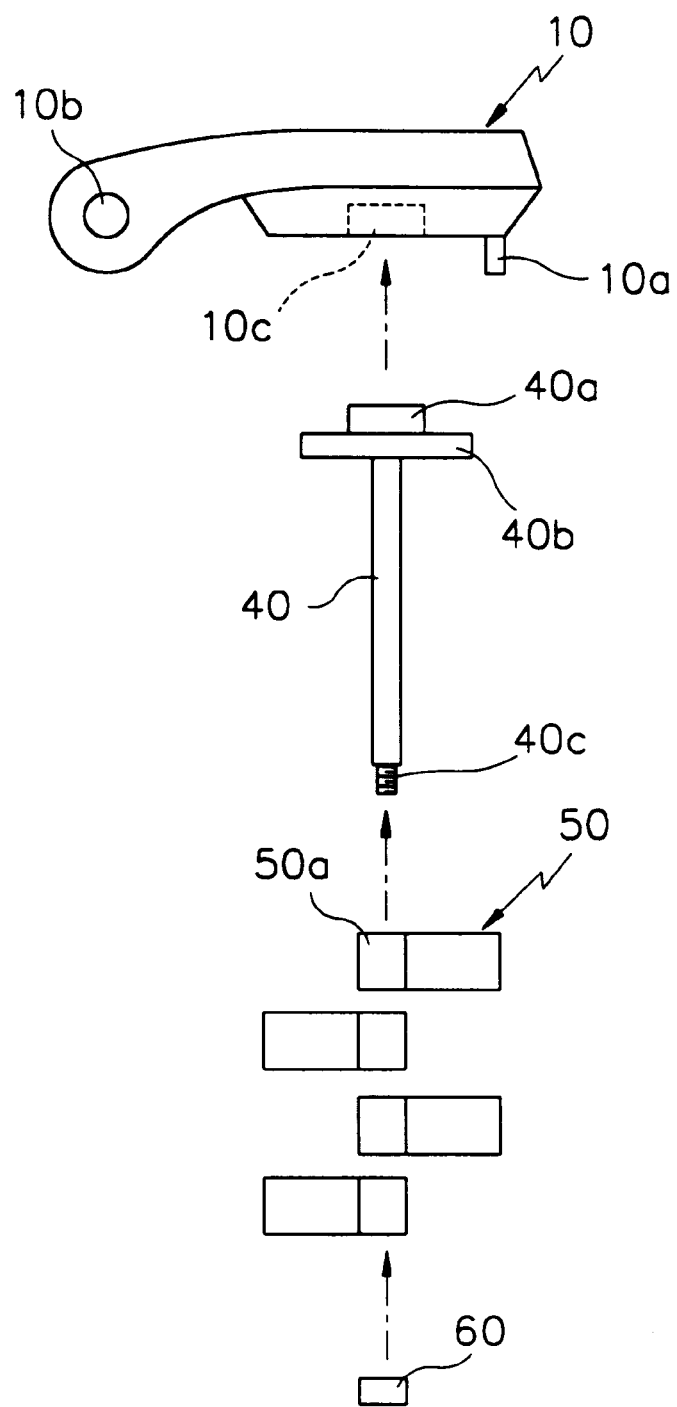
FIG. 3 is an exploded view illustrating a vertical rotation mechanism in a pivotal rotation adjusting apparatus for a flat panel display device according to the present invention.
Figure 4A:
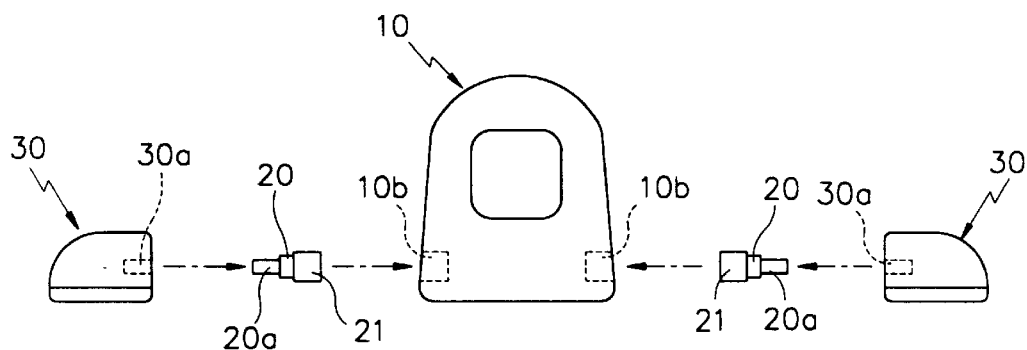
FIG. 4A is an exploded view illustrating a vertical rotation mechanism in the pivotal rotation adjusting apparatus for a flat panel display device according to a first embodiment of the present invention.
Figure 4B:
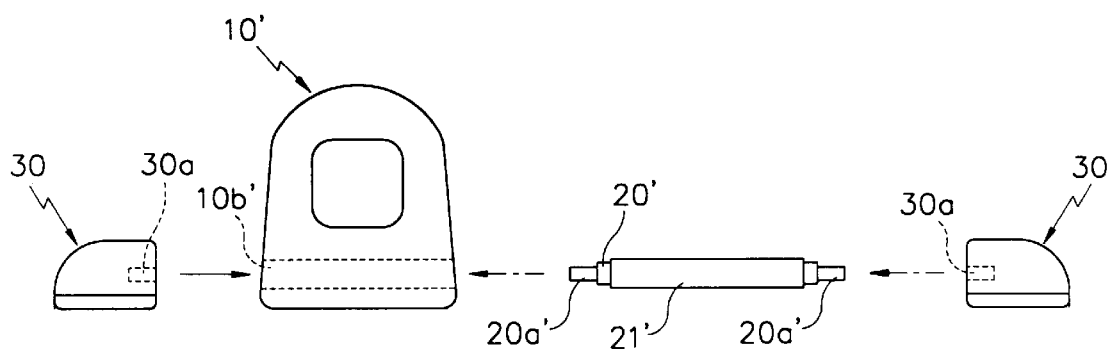
FIG. 4B is an exploded view illustrating a vertical rotation mechanism in the pivotal rotation adjusting apparatus for a flat panel display device according to a second embodiment of the present invention.
Figure 5:
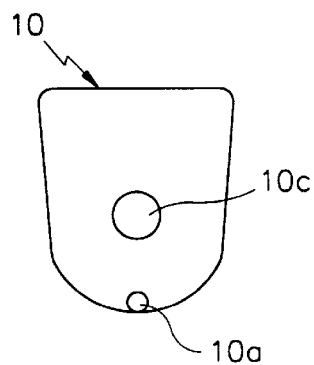
FIG. 5 is a bottom view illustrating a fixed frame in the pivotal rotation adjusting apparatus for a flat panel display device according to the present invention.

As shown in FIGS. 3 through 5, a fixed frame 10 includes a guide protrusion 10a extended from a bottom rear portion thereof, a hole 10b formed in each front side surface thereof, and a first recess 10c formed in a bottom center thereof.

Referring to FIG. 4A, a pair of vertical rotation shafts 20, 20 are pivotally inserted into the holes 10b, 10b in the sides of the fixed frame 10 and appropriately each surrounded by a friction bushing 21. A pin 20a is extended from one end of each of the vertical rotation shafts 20, 20. Here, the pins are smaller in diameter than the vertical rotation shafts 20, 20.

As shown in FIG. 4B, instead of the two holes 10b, 10b shown in FIG. 4A, a single through hole 10b' may be formed in the fixed frame 10' so that there is required only one vertical rotation shaft 20'. Reference numeral 20a' in FIG. 4B represents a vertical rotation shaft.

The preferred embodiment of the present invention may thus employ either one or two vertical rotation shafts, having an identical function and in case of using the single shaft 20' a single friction bushing can be used on the vertical rotation shaft 20'.

A pair of vertical rotation frames 30, 30 respectively disposed to the left and right of the fixed frame 10 are installed to hold on front portions thereof a display screen section such as an LCD monitor. A pair of blind holes 30a, 30a are respectively formed in the side surfaces thereof facing toward the fixed frame 10, and the pins 20a, 20a of the shaft 20 are fixedly inserted therein.

That is, the vertical rotation frames 30, 30 are mounted onto the vertical rotation shaft 20 (20').

Also, as shown in FIG. 3, a horizontal rotation shaft 40 is fixed to the bottom of the fixed frame 10, and a support flange 40b is provided on the upper end of the horizontal rotation shaft 40. A protrusion 40a is upwardly extended from the support flange 40b. A threaded portion 40c is formed on the lower end of the horizontal rotation shaft 40.

The protrusion 40a is fixedly inserted into the first recess 10c in the fixed frame 10, whereby the horizontal rotation shaft 40 is fixedly connected to the fixed frame 10. Accordingly, the fixed frame 10 is engaged to the horizontal rotation shaft 40.

Figure 6:
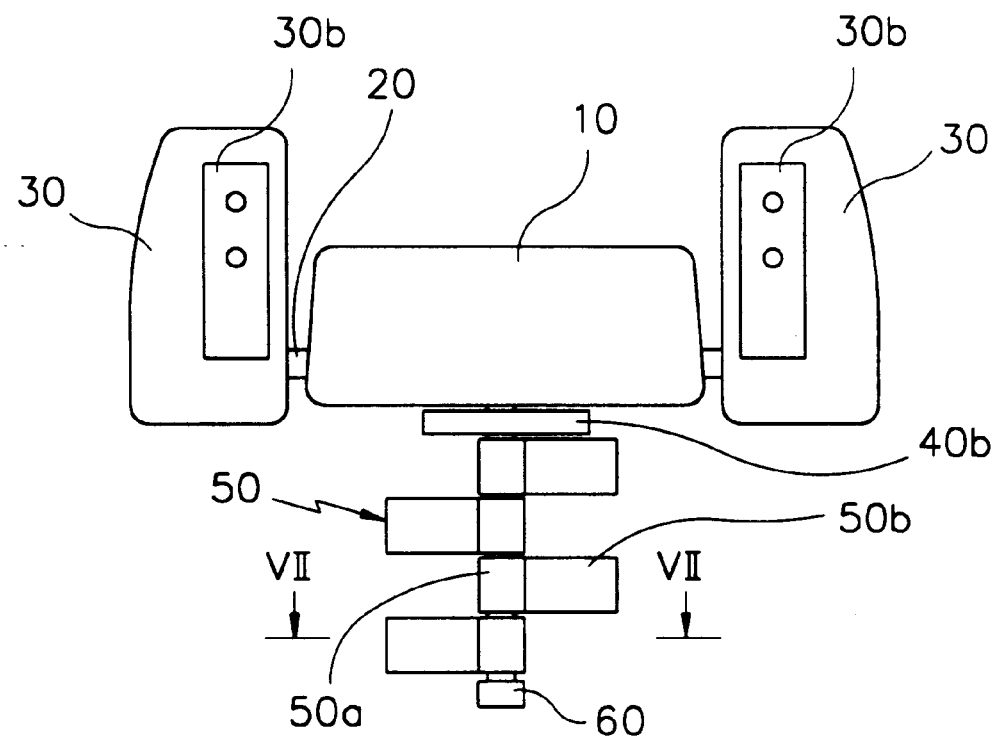
FIG. 6 is a front view illustrating the vertical and horizontal rotation mechanism in the pivotal rotation adjusting apparatus for a flat panel display device according to the present invention.

As shown in FIG. 6, a plurality of support members 50 are carried on the horizontal rotation shaft 40 which is fixed to the fixed frame 10.

Figure 7:
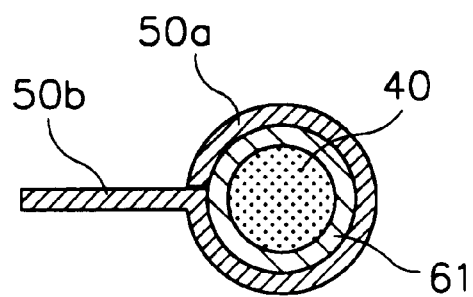
FIG. 7 is a cross-sectional view taken along line VII—VII in FIG. 6.

As further shown in FIG. 7, an annular friction bushing 61 is provided between the outer periphery of the horizontal rotation shaft 40 and the respective inner peripheries of the ends of the support members 50. Specifically, the annular friction bushing 61 is to facilitate the rotation of the horizontal rotation shaft 40 on its own without regard to the support members 50. As a result, the support members 50 are not rotated although the horizontal rotation shaft 40 makes a rotation on its own.

FIG. 7 shows a detailed view of the support member 50. As shown therein, the support member 50 includes an annular portion 50a and a wing portion 50b. The annular portion 50a is formed by folding an end portion of the support member 50, wherein the wing portion 50b is extended radially from the annular portion 50a in the fashion of a hinge plate.

With regard to the engagement between the horizontal rotation shaft 40 and the support members 50, the annular portions 50a of the support members 50 are installed onto the horizontal rotation shaft 40 from the lower end thereof so that the plurality of support members 50 can be lined up side-by-side along on the horizontal rotation shaft 40. At this time, the respective adjacent wing portions 50b extended from the annular portions 50a extend to alternating sides of the horizontal rotation shaft 40.

Then, as shown in FIG. 6, a fixture bushing 60 is threaded onto the threaded portion 40c at the lower end of the horizontal rotation shaft 40.

Figure 8:
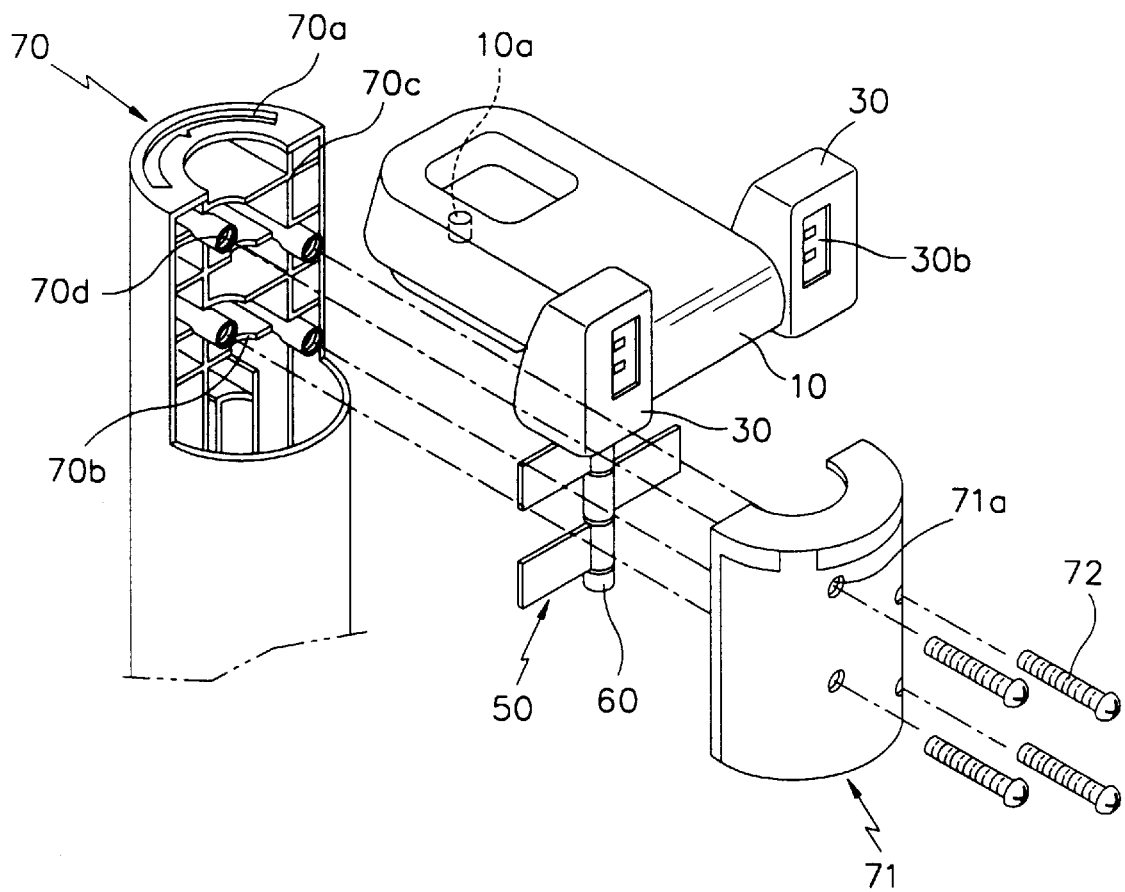
FIG. 8 is an exploded perspective view illustrating the assembly of the pivotal rotation adjusting apparatus for a flat panel display device according to the present invention.

As shown in FIG. 8, the support members 50 engaged on the horizontal rotation shaft 40 are anchored between a base housing 70 and a housing cover 71. The base housing 70 and the housing cover 71 are fastened together as by screws.

The mechanism between the base housing 70 and the horizontal rotation shaft 40 will now be described.

A plurality of transverse ribs 70b with semicircular indentations therein are formed in the interior of the base housing 70 and a plurality of longitudinal ribs 70c are formed in a staggered pattern adjacent to both sides of the transverse ribs 70b.

Threaded bosses 70d are formed at intersections of the transverse ribs 70b with the longitudinal ribs 70c in the base housing 70 in a staggered fashion and receive the screws 72 therein by the screws 70 so as to engage the base housing 70 to the housing cover 72.

A corresponding plurality of screw holes 71a are provided in the housing cover 71 in order to enable the screws 72 to pass therethrough and into the corresponding threaded bosses 70d.

In order to fasten the housing cover 71 onto the base housing 70 using the screws 72, a peripheral surface of the each annular portion 50a and a peripheral surface of the fixture bushing 60 are abutted against the semicircular indentation in a corresponding one of the transverse ribs 70b in the base housing 70, and a side of the corresponding wing portion 50b is abutted against a corresponding one of the longitudinal ribs 70c. The opposite peripheral surface of the annular portion 50a, the opposite peripheral surface of the fixture bushing 60 are abutted against the respective semicircular indentation formed in the corresponding ones of the transverse ribs (not shown) in the housing cover 71 which are similarly provided with corresponding transverse ribs 70*b* and the longitudinal ribs 70*c*.

The threaded bosses 70*d* arranged in a staggered pattern in the base housing 70 are protruded between the wing portions 50*b* of the support members 50 so as to be matched into the screw holes 71*a*. Correspondingly, the screws 72 are inserted into the screw holes 71*a* and threaded into the corresponding bosses 70*d*, thereby fixing the housing cover 71 onto the base housing 70.

Accordingly, the horizontal rotation shaft 40 is pivotally disposed between the base housing 70 and the housing cover 71, and the support members 50 are fixedly anchored between the base housing 70 and the housing cover 71. The support flange 40*b* of the horizontal rotation shaft 40 serves to maintain the support members 50 in place and is positioned on the upper end surface of the base housing 70 and the housing cover 71.

Figure 9:
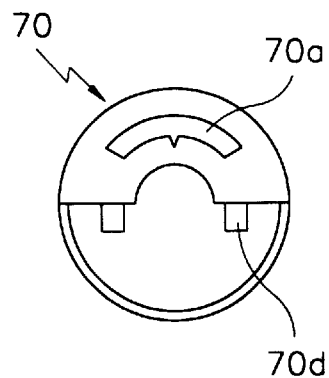
FIG. 9 is a plan view illustrating a base housing with regard to the pivotal rotation adjusting apparatus for a flat panel display device according to the present invention.

As shown in FIGS. 8 and 9, an arcuate slot 70*a* is formed in the upper surface of the base housing 70 and serves to receive and guide therein the guide protrusion 10*a* extended from the lower surface of the fixed frame 10. That is, the guide protrusion 10*a* is movably inserted into the arcuate slot 70*a* so that the pivotal movement of the display screen section (not shown) can be restrained within an appropriate angular range, thereby facilitating the adjustment of a swiveling angle of the display screen section (not shown). The arcuate slot 70*a* may have one or more detents at angular intervals therealong.

Here, reference numeral 30*b* represents a fixture portion of the vertical rotation frames 30 to which the screen section (not shown) is fixed.

The thusly constituted pivotal rotation adjusting apparatus for a flat panel display device according to the present invention enables a user to vertically adjust the screen section (not shown) mounted on the vertical rotation frames 30, 30 in a manner in which the vertical rotation shaft 20' is pivotally rotated and accordingly the vertical rotation frames 30, 30 are inclined upwardly and downwardly.

As discussed above, when the display screen section (not shown) is adjusted upwardly or downwardly, the friction bushing 21 (21') surrounding the vertical rotation shaft (20) 20' fixedly inserted into the vertical rotation frame 30 through the fixed frame 10 (10') provides a friction fit against the inner periphery of the holes 10*b*, 10*b* (or the through hole 10*b'*) of the fixed frame 10 (10'), thereby pivotally and stably inclining the screen section (not shown) and minimizing the fluctuation of the screen section (not shown) resulting from its self-weight while constantly maintaining the inclination angle of the screen section (not shown).

Further, the pivotal rotation adjusting apparatus for a flat panel display device according to the present invention enables a user to pivotally tilt the screen section (not shown) mounted on the vertical rotation frames 30, 30 leftwardly or rightwardly in a manner in which the fixed frame 10 engaged to the vertical rotation frames 30, 30 becomes horizontally rotatable in conjunction with the pivotal rotation of the horizontal rotation shaft 40.

When the screen section (not shown) makes a rightward or leftward movement, the plurality of support members 50 assembled in zigzag fashion on the horizontal rotation shaft 40 serve to support the pivotal rotation of the horizontal rotation shaft 40, and the pivotal rotation of the horizontal rotation shaft 40 is additionally guided by the fixture bushing 60 carried on the lower end of the horizontal rotation shaft 40.

Also, when the fixed frame 10 makes a leftward or rightward movement in accordance with the leftward and rightward rotation of the screen display section, the protrusion 10*a* extended from the bottom rear portion of the fixed frame 10 is guided within the arcuate guide slot 70*a* formed in the upper surface of the base housing 70, thereby adjusting a rotation angle of the screen display section.

That is, the horizontal rotation of the display screen section is smoothly adjusted resulting from the function of the support members 50 and the guide protrusion 10*a*, thereby restraining a possible fluctuation of the screen section due to its self-weight.

As described above, the pivotal rotation adjusting apparatus for a flat panel display device according to the present invention allows effective adjustment of the horizontal rotation angle as well as the vertical rotation angle of the display screen section.

Further, the pivotal rotation adjusting apparatus for a flat panel display device according to the present invention having the friction bushings surrounding on the periphery of the vertical rotation shaft and the support members carried on the horizontal rotation shaft in staggered pattern prevents the screen display section, the base housing and the vertical rotation frame from being fluctuated during their rotational movement and the entire device set from being shaken, thereby stabilizing the entire assembly.

As the present invention may be embodied in various forms without departing from the spirit of the essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to be embraced by the appended claims.

What is claimed is:

1. A pivotal rotation adjusting apparatus for a flat panel display device, comprising:

a fixed frame having a hole formed in each opposing surface thereof;

a pair of vertical rotation shafts respectively pivotally carried at one end in corresponding ones of the holes in the fixed frame and each having a pin axially extended from an end thereof;

a vertical rotation frame disposed on each opposing side of the fixed frame, and having a hole receiving therein a corresponding one of the pins axially extended from a respective one of the vertical rotation shafts;

a horizontal rotation shaft fixedly engaged to a lower portion of the fixed frame and being pivotally rotatable in conjunction with the fixed frame;

a base housing rotatably supporting the horizontal rotation shaft therein;

a housing cover correspondingly engaged to the base housing; and a plurality of support means carried on the horizontal rotation shaft and anchored between the base housing and the housing cover.

2. A pivotal rotation adjusting apparatus for a flat panel display device comprising:

a fixed frame having a through hole formed along an edge therethrough;

a vertical rotation shaft pivotally inserted into the through hole and having a pin axially extended from each end thereof;

a vertical rotation frame disposed on one side of the fixed frame and having a hole therein receiving of the pin axially extended from the of the vertical rotation shaft;

a horizontal rotation shaft fixedly engaged to a lower portion of the fixed frame and being pivotally rotatable in conjunction with the fixed frame;

a base housing rotatably supporting the horizontal rotation shaft therein;

a housing cover correspondingly engaged to the base housing; and a plurality of support means are carried on the horizontal rotation shaft and anchored between the base housing and the housing cover.

3. The apparatus of claim 1 or 2, wherein each of the plurality of support means comprises:

an annular portion; and a wing portion radially extended from the annular portion.

4. The apparatus of claim 2, wherein the wing portions of adjacent ones of the support means are disposed in a staggered zigzag pattern.

5. The apparatus of claim 1 or 2, wherein an annular friction bushing is inserted between an outer periphery of the horizontal rotation shaft and an inner periphery of an annular portion of each of the plurality of support means.

6. The apparatus of claim 1 or 2, wherein a support flange is provided on an upper portion of the horizontal rotation shaft, and a fixture bushing is threadedly engaged to a threaded portion formed on a lower end of the horizontal rotation shaft.

7. The apparatus of claim 1 or 2, wherein the support means do not move during a pivotal movement of the horizontal rotation shaft.

8. The apparatus of claim 2, wherein the vertical rotation shafts are each surrounded by a friction bushing.

9. The apparatus of claim 2, wherein a guide protrusion is formed on a lower surface of the fixed frame, and a guide slot is formed in the upper surface of the base housing, whereby the guide protrusion is movably inserted into and guided by the guide slot.

10. The apparatus of claim 9, wherein the guide slot is arcuate.

11. The apparatus of claim 2, wherein a plurality of centrally indented transverse ribs are formed on an inner wall of each of the base housing and the housing cover and a plurality of longitudinal ribs are formed to each side of the transverse ribs in a staggered zigzag pattern and threaded bosses are formed in the base housing.

12. The apparatus of claim 11, wherein peripheral surfaces of annular portions of a plurality of support means and a fixture bushing carried on the horizontal rotation shaft are abutted against corresponding ones of the centrally indented ribs in the base housing, and side surfaces of wing portions of the support means are abutted against corresponding ones of the longitudinal ribs, whereby the support means are anchored between the base housing and the housing cover.

* * * * *